(12) United States Patent
Ha

(10) Patent No.: US 9,429,234 B2
(45) Date of Patent: Aug. 30, 2016

(54) GEAR STAGE DISPLAY DEVICE OF VEHICLE AND METHOD FOR CONTROLLING THE SAME

(71) Applicant: SL Corporation, Daegu (KR)

(72) Inventor: Hyun Chul Ha, Gyeongsangbuk-Do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 14/550,501

(22) Filed: Nov. 21, 2014

(65) Prior Publication Data

US 2015/0152965 A1    Jun. 4, 2015

(30) Foreign Application Priority Data

Dec. 3, 2013    (KR) .................. 10-2013-0149224

(51) Int. Cl.
*B60Q 3/02*    (2006.01)
*F16H 63/42*   (2006.01)

(52) U.S. Cl.
CPC .............. *F16H 63/42* (2013.01); *B60Q 3/024* (2013.01); *B60Q 3/0293* (2013.01)

(58) Field of Classification Search
CPC .......... H05B 33/0815; H05B 33/0818; H05B 37/029; H05B 37/02; H05B 41/3925; B60K 1/00; B60K 2310/00; B60K 35/00
USPC ....... 315/291, 76, 77, 307; 701/1; 340/407.1
See application file for complete search history.

(56) References Cited

U.S. PATENT DOCUMENTS

| | | | | |
|---|---|---|---|---|
| 9,190,885 B2* | 11/2015 | Bauerlein | ............... | F16H 48/06 |
| 2010/0149073 A1* | 6/2010 | Chaum | .............. | G02B 27/0093 |
| | | | | 345/8 |
| 2013/0030604 A1* | 1/2013 | Ohshima | ............... | B62K 11/14 |
| | | | | 701/1 |
| 2014/0020496 A1* | 1/2014 | Heo | ...................... | F16H 59/044 |
| | | | | 74/473.12 |

FOREIGN PATENT DOCUMENTS

| | | | | |
|---|---|---|---|---|
| JP | 2006142944 | * | 6/2008 | ............ B60K 35/00 |
| KR | 10-2004-0031251 A | | 4/2004 | |
| KR | 10-1047263 B1 | | 7/2011 | |
| KR | 10-2011-0132716 A | | 12/2011 | |

* cited by examiner

*Primary Examiner* — Douglas W Owens
*Assistant Examiner* — Syed M Kaiser
(74) *Attorney, Agent, or Firm* — Mintz Levin Cohn Ferris Glovsky and Popeo, P.C.; Kongsik Kim; Carolina Säve

(57) ABSTRACT

A gear stage display device of a vehicle is provided and includes a light-emitting unit that is configured to generate light with different brightnesses. In addition, a first brightness controller is connected to the light-emitting unit and is configured to adjust the light-emitting unit to a first brightness. A second brightness controller is connected in parallel to the first brightness controller and is configured to adjust the light-emitting unit to a second brightness. In response to receiving a brightness control signal and a gear stage selection signal, one of the first brightness controller and the second brightness controller is configured to adjust the light-emitting unit.

18 Claims, 5 Drawing Sheets

GEAR STAGE DISPLAY DEVICE OF VEHICLE AND METHOD FOR CONTROLLING THE SAME

CROSS-REFERENCE(S) TO RELATED APPLICATION

This application claims priority to Korean Patent Application No. 10-2013-0149224 filed on Dec. 3, 2013, the disclosure of which is incorporated herein by reference in its entirety.

TECHNICAL FIELD

The disclosure relates to a gear stage display device of a vehicle, and more particularly, to a gear stage display device of a vehicle, having a simplified structure and capable of effectively displaying gear stages by adjusting the brightness of a light source.

RELATED ART

Automotive transmissions change gear ratios to constantly maintain the rotation of an engine based on the speed of a vehicle. A shift lever, which is disposed within the automotive transmission, may be operated by the driver to change the gear ratio. Automotive transmissions may include two types of transmissions: a manual transmission and an automatic transmission. A driver is able to manually change gears within a manual transmission. Conversely, within the automatic transmission, the gears automatically change based on the speed of a vehicle in response to a drive (D) mode being selected by a driver.

Another type of automotive transmission may include a manumatic transmission that may perform both a manual shift operation and an automatic shift operation. The manumatic transmission may perform the manual shift operation in response to a driver increasing or decreasing the gear ratio, and simultaneously (e.g., at the same time) perform the automatic shift operation in parallel. Alternatively, the manumatic transmission may also include an automotive transmission together with a manual transmission. An automotive transmission may be equipped with a gear stage display device to allow a driver to recognize a gear stage currently selected and one or more gear stages available for selection from the current gear stage, which may allow the driver to shift gears using the gear stage display device.

In a related-art automotive transmission, a plurality of light sources is provided for different gear stages to distinguish a gear stage currently being selected from other non-selected gear stages. More specifically, a notification of the current gear stage or one or more gear stages that are currently available for selection from the current gear stage may be provided by selectively turning on one of the plurality of light sources.

However, using a plurality of light sources for different gear stages may increase the number of parts used and the manufacturing cost of an automotive transmission, and complicate the structure of an automotive transmission.

SUMMARY

The present disclosure provides a gear stage display device of a vehicle, which may use the same light source for different gear stages to indicate a gear stage currently being selected and one or more gear stages available for selection from the current gear stage, and may have a simplified structure. In addition, the present disclosure provides a gear stage display device of a vehicle, which may effectively display gear stages by adjusting a brightness of a light source, which may display both a gear stage currently being selected and other non-selected gear stages.

According to an exemplary embodiment of the disclosure, a gear stage display device of a vehicle, may include: a light-emitting unit configured to generate light with different brightnesses; a first brightness controller connected to the light-emitting unit and configured to adjust the light-emitting unit to a first brightness; and a second brightness controller connected in parallel to the first brightness controller and configured to adjust the light-emitting unit to a second brightness, wherein in response to receipt of a brightness control signal and a gear stage selection signal, one of the first brightness controller and the second brightness controller may be configured to adjust the light-emitting unit.

According to exemplary embodiments of the invention, it may be possible to simplify the structure of a gear stage display device of a vehicle using the same light source for different gear stages to indicate whether each of the gear stages is being selected. In addition, since the brightness of a light source may be adjusted using the combination of a gear stage selection signal and a brightness control signal, it may be possible to more easily and effectively adjust the brightness of the light source.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Figure 1:
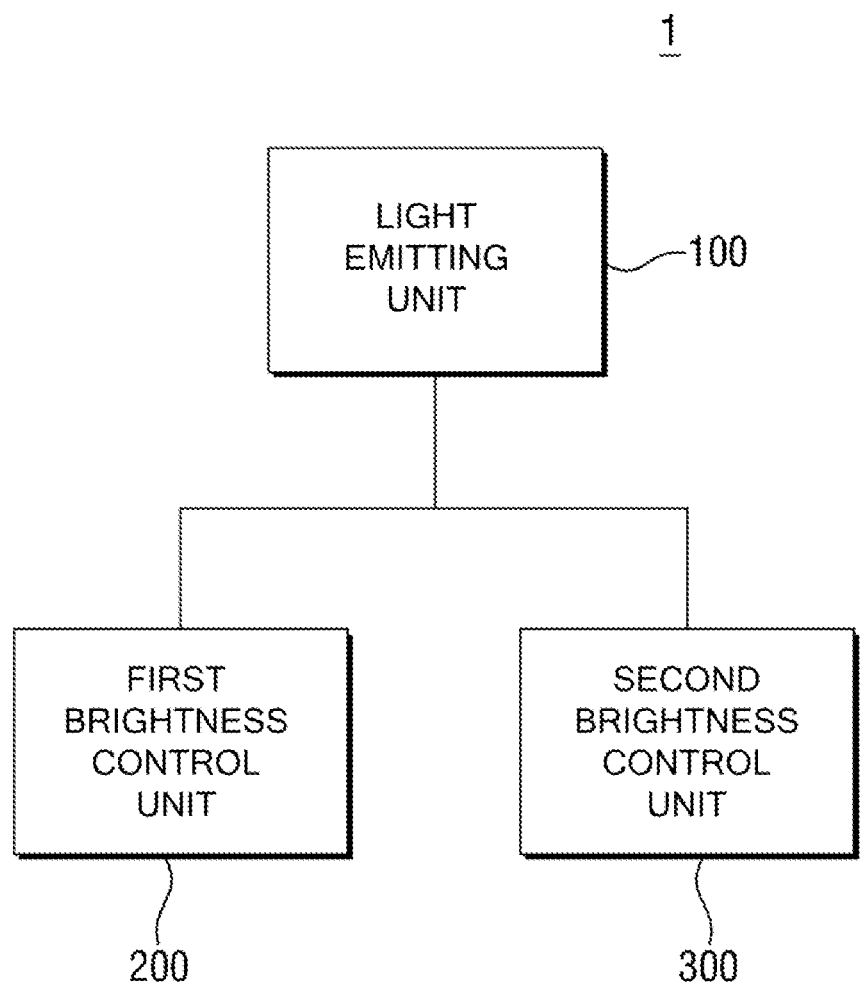
FIG. 1 is an exemplary block diagram of a gear stage display device of a vehicle, according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the disclosure and methods of accomplishing the same may be understood more readily by reference to the following. The disclosure may, however, be embodied in many different provides and should not be construed as being limited to the exemplary embodiments set forth herein. Rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

Exemplary embodiments will hereinafter be described with reference to the accompanying drawings.

FIG. 1 is an exemplary block diagram of a gear stage display device of a vehicle, according to an exemplary embodiment of the disclosure. Referring to FIG. 1, a gear stage display device 1 of a vehicle may include a light-emitting unit 100, a first brightness controller 200 and a second brightness controller 300. The light-emitting unit 100 may be configured to generate light with different brightnesses using a single light source. The light-emitting unit 100 may be provided for each gear stage available in an automotive transmission (not illustrated), and may further be configured to generate light with different brightnesses for different gear stages.

In an exemplary embodiment, in response to the gear stages available in the automotive transmission that may include a park ("P"), a reverse ("R"), a neutral ("N") and a drive ("D") stages, a light-emitting unit 100 may be provided for each of the "P", "R", "N" and "D" stages. For example, in response to the "D" stage being selected, the light-emitting unit 100 corresponding to the "D" stage may be configured to generate light with a first brightness, and the other (e.g., remaining) light-emitting units 100 may be configured to generate light with a second brightness to thus cause the D stage to be illuminated with a light of higher intensity than the other stages. The first brightness may be brighter than the second brightness.

The first brightness controller 200 and the second brightness controller 300 may be connected in parallel, and may each be configured to adjust the light-emitting unit 100 to different brightnesses. The first brightness controller 200 and the second brightness controller 300 may be configured to adjust the duration for which the light-emitting unit 100 is operated to generate light and thus to emit light with different brightnesses.

The first brightness controller 200 and the second brightness controller 300, like the light-emitting unit 100, may be provided for each gear stage available in the automotive transmission. In response to receiving a brightness control signal and a gear stage selection signal, one of the first brightness controller 200 and the second brightness controller 300 may be configured to transmit a current into the light-emitting unit 100 to generate light. The brightness control signal may be a signal that indicates a duration that the light-emitting unit 100 is operated to generate light and the gear stage selection signal may be a signal that indicates whether a predetermined gear stage has been selected. Further, the gear stage selection signal may be a signal output from a sensor configured to detect the position of a shift lever.

Figure 2:
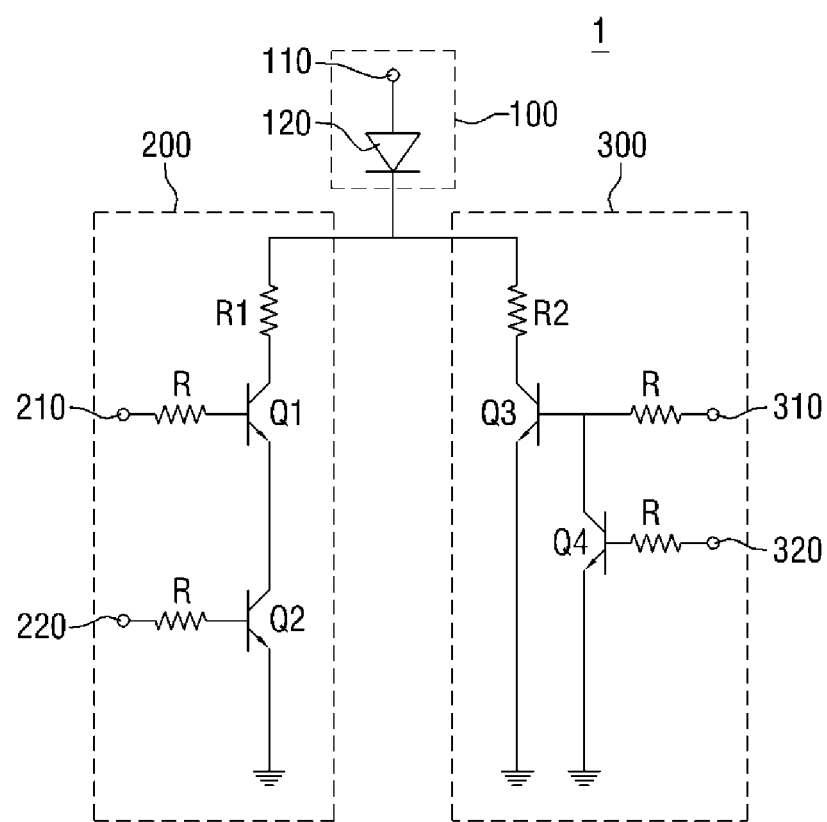
FIG. 2 is an exemplary circuit diagram of the gear stage display device of FIG. 1 according to an exemplary embodiment of the disclosure.

The gear stage display device 1 will hereinafter be described in further detail with reference to FIG. 2. Referring to FIG. 2, the light-emitting unit 100 may include a power terminal configured to receive power and a light source 120. In response to one of the first brightness controller 200 and the second brightness controller 300 being operated (e.g., current being transmitted from a brightness controller), a current applied from the power terminal 110 may flow into the light source 120 to generate light with a predetermined brightness. In an exemplary embodiment, one or more light-emitting diodes (LEDs) may be used as the light source 120. Alternatively, various lighting devices (e.g., light bulbs) may be used as the light source 120.

The first brightness controller 200 may include a first switching device Q1, which may be connected to the light-emitting unit 100; a first signal input terminal 210 configured to receive a first brightness control signal and transmit the first brightness control signal to the first switching device Q1; a second switching device Q2, which may be connected to the first switching device Q1; and a second signal input terminal 220 configured to receive a gear stage selection signal and transmit the gear stage selection signal to the second switching device Q2. The first switching device Q1 and the second switching device Q2 may be transistors but the invention is not limited thereto. In other words, various devices capable of being electrically or physically turned on or off in response to receiving a signal may be used as the first switching device Q1 and the second switching device Q2. The first signal input terminal 210 and the second signal input terminal 220 may be connected to a base of the first switching device Q1 and the second switching device Q2, respectively.

A collector of the first switching device Q1 may be connected to the light-emitting unit 100 (e.g., the light source 120) by a first resistor R1, and an emitter of the first switching device Q1 may be connected to a collector of the second switching device Q2. The emitter of the second switching device Q2 may be connected to a ground. The first switching device Q1 may be turned on or off based on the first brightness control signal, and a current may flow between the collector and the emitter of the first switching device Q1. The second switching device Q2 may be turned on or off based on the gear stage selection signal, and a current may flow between the collector and the emitter of the second switching device Q2.

The first switching device Q1 is configured to turn on in response to receiving the first brightness control signal and the second switching device Q2 is configured to turn on in response to receiving the gear stage selection signal. The first switching device Q1 and the second switching device Q2 may be turned on, and a current may flow into the first switching device Q1 and the second switching device Q2, respectively. As a result, light may be emitted from the light source 120 within the light-emitting unit 100.

A pulse width modulation (PWM) signal may be used as the first brightness control signal, and the brightness of light generated by the light-emitting unit 100 may be determined based on the duty ratio of the first brightness control signal. The duty ratio of the first brightness control signal may indicate the pulse width of the first brightness control signal during a predetermined period of time, and particularly, the ratio of the "high" period (e.g., when the first brightness control signal has a substantially high voltage of, for example, about 5V) to the "low" period (e.g., when the first brightness control signal has a substantially low voltage of, for example, about 0V) of the first brightness control signal. The longer the "high" period of the first brightness control signal, the longer the duration for which a current may flow into the light source 120, and the longer the duration for which the light source 120 may be configured to generate light. Accordingly, the longer the "high" period of the first brightness control signal is, the brighter the light generated by the light source 120 may become. The first signal input terminal 210 and the second signal input terminal 220 may be connected to the first switching device Q1 and the second switching device Q2, respectively, by input resistors R. The resistance of the input resistors R may vary.

Further, the second brightness controller 300 may include: a third switching device Q3, which may be connected to the light-emitting unit 100; a third signal input terminal 310 configured to receive a second brightness control signal and transmit the second brightness control signal to the third switching device Q3; a fourth switching device Q4, which may be connected between the third switching device Q3 and the third signal input terminal 310; and a fourth signal input terminal 320 configured to receive a gear stage selection signal and transmit the gear stage selection signal to the fourth switching device Q4. The third switching device Q3 and the fourth switching device Q4, like the first switching device Q1 and the second switching device Q2, may be transistors, but the invention is not limited thereto. In other words, may also be various devices capable of being electrically or physically turned on or off in response to receiving a signal may be used as the third switching device Q3 and the fourth switching device Q4.

A collector of the third switching device Q3 may be connected to the light-emitting unit 100 (e.g., the light source 120) via a second resistor R2, and a base of the third switching device Q3 may be connected to the third signal input terminal 310. A collector of the fourth switching device Q4 may be connected to the base of the third switching device Q3. Further, an emitter of the fourth switching device Q4 may be connected to the ground, and a base of the fourth switching device Q4 may be connected to the fourth signal input terminal 320. The third signal input terminal 310 and the fourth signal input terminal 320 may be connected to the third switching device Q3 and the fourth switching device Q4, respectively, via input resistors R. The resistance of the input resistors R may vary.

Figure 3:
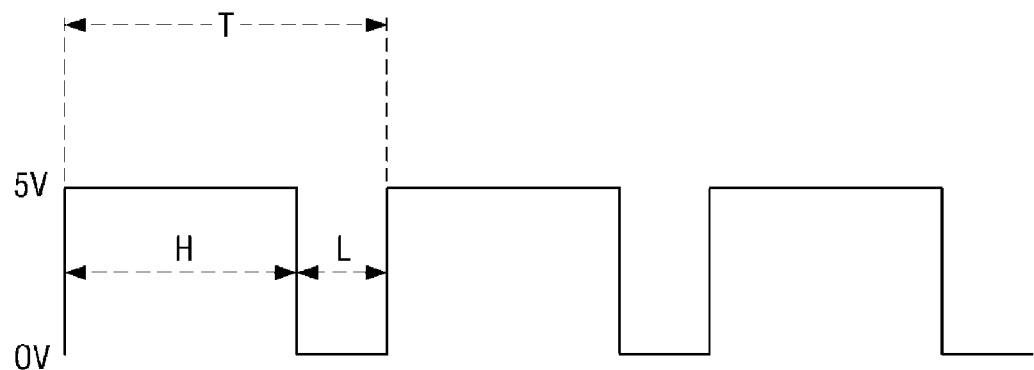
FIG. 3 is an exemplary timing diagram of a first brightness control signal according to an exemplary embodiment of the disclosure.
Figure 4:
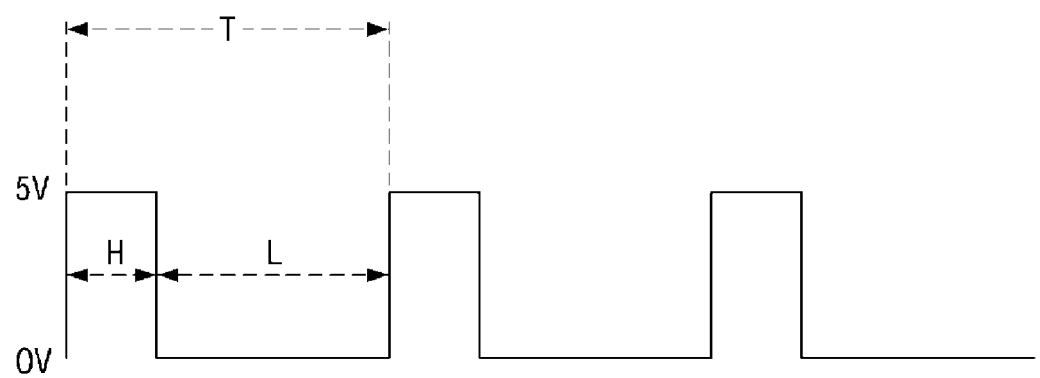
FIG. 4 is an exemplary timing diagram of a second brightness control signal according to an exemplary embodiment of the disclosure.

The second brightness control signal, like the first brightness control signal, may be a PWM signal. In an exemplary embodiment, the second brightness control signal may have a shorter "high" period than the first brightness control signal allowing a dimmer light (e.g., light of less light intensity) to be generated in response to the second brightness control signal compared to in response to the first brightness control signal. More specifically, referring to FIGS. 3 and 4, the ratio of a "high" period H of the first brightness control signal to a unit period T may be greater than the ratio of a "high" period H of the second brightness control signal to the unit period T. Accordingly, since the time period to generate light is less for the second brightness control signal than for the first brightness control signal, the time period to not generate light may be greater for the second brightness control signal than for the first brightness control signal and dimmer light may be generated in response to the second brightness control signal than in response to the first brightness control signal.

Figure 5:
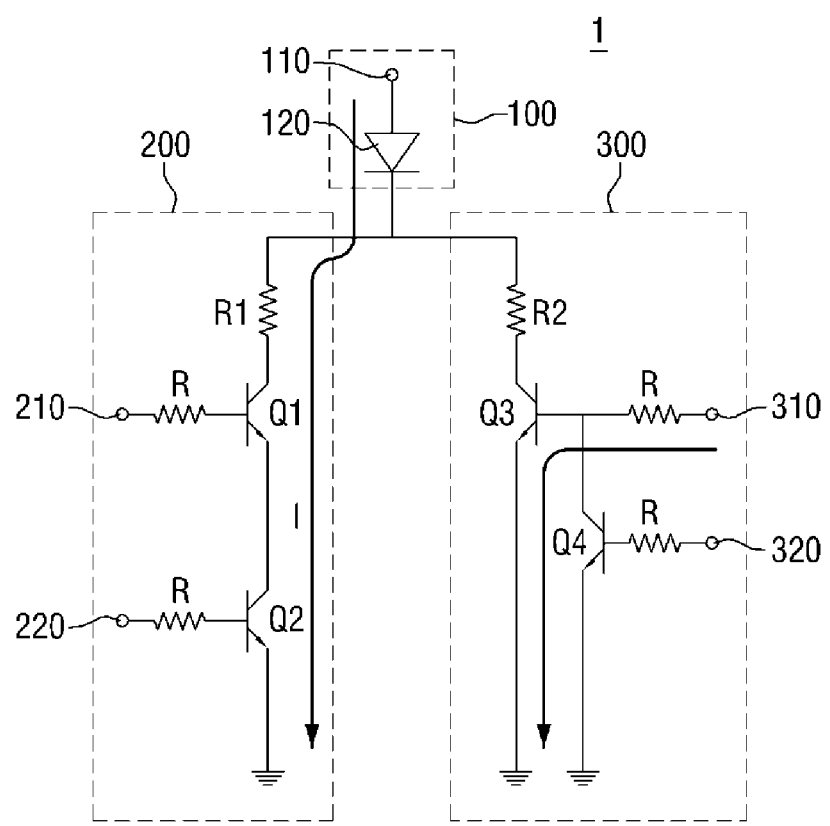
FIG. 5 is an exemplary circuit diagram illustrating the flow of a current by a first brightness controller illustrated in FIG. 1 according to an exemplary embodiment of the disclosure.

The gear stage selection signal, which may be input to the fourth switching device Q4, may be about the same as the gear stage selection signal, which may be input to the second switching device Q2. In response to a particular gear stage being selected, a single gear stage selection signal corresponding to the particular gear stage may be input to both the second switching device Q2 and the fourth switching device Q4. Accordingly, in response to the gear stage selection signal being input, the second switching device Q2 and the fourth switching device Q4 may be configured to turn on, and a current I, which may be generated by power supplied via the power terminal 110, may flow through the first brightness controller 200, as illustrated in FIG. 5. Within the second brightness controller 300, since the fourth switching device Q4 may be turned on, the second brightness control signal, which may be input to the third signal input terminal 310, may be transmitted via the fourth switching device Q4. Accordingly, the third switching device Q3 may remain off, and as a result, no current may flow through the second brightness controller 300.

Figure 6:
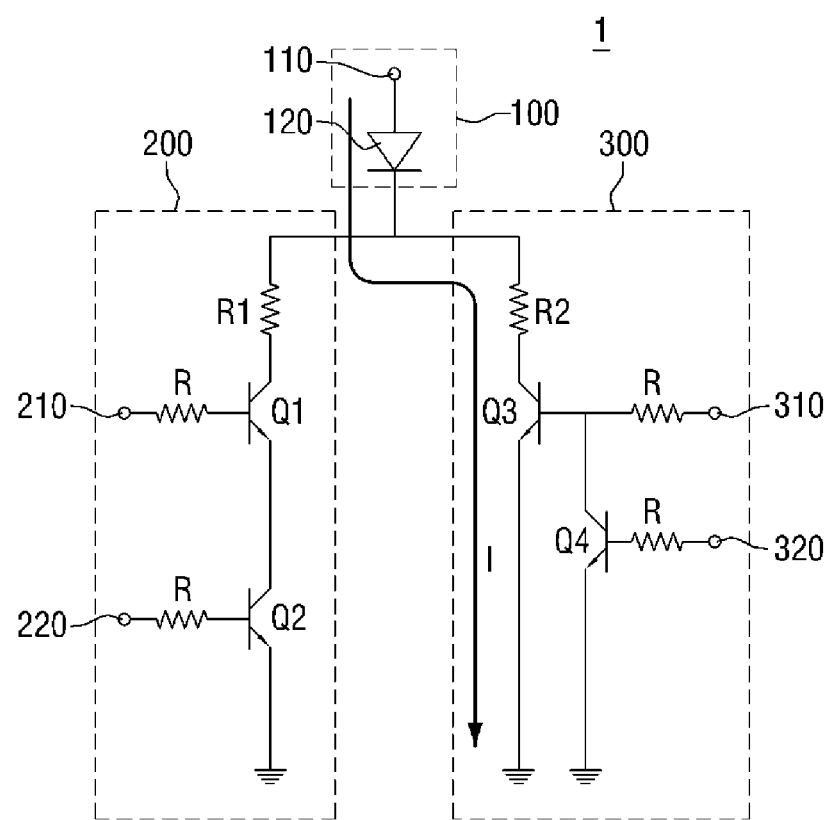
FIG. 6 is an exemplary circuit diagram illustrating the flow of a current by a second brightness controller illustrated in FIG. 1 according to an exemplary embodiment of the disclosure.

Alternatively, when no gear stage selection signal is received, the second switching device Q2 may be configured to turn off, and as a result, no current may flow through the first brightness controller 200. Within the second brightness controller 300, the fourth switching device Q4 may be configured to turn off, and the second brightness control signal, which may be input to the third signal input terminal 310, may be input to the third switching device Q3. Accordingly, the third switching device Q3 may be configured to turn on, and a current I may flow through the second brightness controller 300, as illustrated in FIG. 6. As a result, light with a brightness that corresponds to the second brightness control signal may be generated by the light source 120.

In an exemplary embodiment, the first brightness control signal and the second brightness control signal may both be continuously input, and one of the first brightness controller 200 and the second brightness controller 300 may be configured to selectively turn on, and allow a current to flow there through, based on whether the gear stage selection signal is input. As a result, light with a brightness that corresponds to one of the first brightness control signal and the second brightness control signal may be generated. However, the invention is not limited to this exemplary embodiment. Either the first brightness control signal or the second brightness control signal may be selectively input based on whether the gear stage selection signal is input.

In an exemplary embodiment, the first brightness control signal and the second brightness control signal may be PWM signals with different duty ratios to generate light with different brightnesses. In another exemplary embodiment, the first brightness control signal and the second brightness control signal may have the same duty ratio. Further, the first resistor R1, between the light-emitting unit 100 and the first switching device Q1, and the second resistor R2, between the light-emitting unit 100 and the third switching device Q3, may be configured to have different resistances. As a result, currents with different intensities may flow, and the brightness of light generated by the light source 120 may be configured to vary accordingly. For example, the first resistor R1 and the second resistor R2 may be variable resistors, and the resistance of the first resistor R1 and the second resistor R2 may vary to generate different currents that correspond to different brightnesses.

The light source 120 of the light-emitting unit 100 may be configured to generate light with different brightnesses and display gear stages, instead of using a plurality of light sources for different gear stages. Accordingly, the structure of a gear stage display device may be simplified, and the manufacturing cost of a gear stage display device may be reduced.

While the disclosure has been particularly shown and described with reference to exemplary embodiments thereof, it will be understood by those of ordinary skill in the art that various changes in provide and detail may be made therein without departing from the spirit and scope of the disclosure as defined by the following claims. The exemplary embodiments should be considered in a descriptive sense only and not for purposes of limitation.

What is claimed is:

1. A gear stage display device of a vehicle, comprising:
    a light-emitting unit configured to generate light with different brightnesses;
    a first brightness controller connected to the light-emitting unit and configured to adjust the light-emitting unit to a first brightness; and
    a second brightness controller connected in parallel to the first brightness controller and configured to adjust the light-emitting unit to a second brightness,
    wherein in response to receiving a brightness control signal and a gear stage selection signal, one of the first brightness controller and the second brightness controller is operated to adjust the light-emitting unit to one of the first brightness and the second brightness, and
    wherein the first brightness controller includes: a first switching device connected to the light-emitting unit; a first signal input terminal configured to receive a first brightness control signal and transmit the first brightness control signal to the first switching device; a second switching device connected to the first switching device; and a second signal input terminal configured to receive the gear stage selection signal and transmit the gear stage selection signal to the second switching device.

2. A gear stage display device of a vehicle, comprising:
    a light-emitting unit configured to generate light with different brightnesses;
    a first brightness controller connected to the light-emitting unit and configured to adjust the light-emitting unit to a first brightness; and
    a second brightness controller connected in parallel to the first brightness controller and configured to adjust the light-emitting unit to a second brightness,
    wherein in response to receiving a brightness control signal and a gear stage selection signal, one of the first brightness controller and the second brightness controller is operated to adjust the light-emitting unit to one of the first brightness and the second brightness, and
    wherein the second brightness controller includes: a third switching device connected to the light-emitting unit; a third signal input terminal configured to receive a second brightness control signal and transmit the second brightness control signal to the third switching device; a fourth switching device connected between the third switching device and the third signal input terminal; and a fourth signal input terminal configured to receive the gear stage selection signal and transmit the gear stage selection signal to the fourth switching device.

3. The gear stage display device of claim 1, wherein the first brightness controller is further configured to display a gear stage selected from a plurality of gear stages with the first brightness and the second brightness controller is further configured to display the other non-selected gear stages with the second brightness.

4. The gear stage display device of claim 1, wherein the light-emitting unit includes: a power terminal configured to receive applied power; and a light source configured to generate light based on a current generated by the applied power.

5. The gear stage display device of claim 1, wherein the first brightness controller includes: a first switching device connected to the light-emitting unit; a first signal input terminal configured to receive a first brightness control signal and transmit the first brightness control signal to the first switching device; a second switching device connected to the first switching device; and a second signal input terminal configured to receive the gear stage selection signal and transmit the gear stage selection signal to the second switching device and wherein the first brightness controller further includes a first resistor connected between the light-emitting unit and the first switching device.

6. The gear stage display device of claim 5, wherein the first resistor is a variable resistor.

7. The gear stage display device of claim 5, wherein the first signal input terminal and the second signal input terminal are connected to the first switching device and the second switching device, respectively, via input resistors.

8. The gear stage display device of claim 5, wherein the first switching device and the second switching device are connected in series, and wherein the first switching device is configured to turn on in response to receiving the first brightness control signal and the second switching device is configured to turn on in response to receiving the gear stage selection signal.

9. The gear stage display device of claim 1, wherein the brightness control signal includes two pulse width modulation (PWM) signals with different duty ratios input to the first brightness controller and the second brightness controller, respectively.

10. The gear stage display device of claim 1, wherein the brightness control signal includes a PWM signal with a duty ratio input to both the first brightness controller and the second brightness controller, wherein the first brightness controller and the second brightness controller are connected to the light-emitting unit via resistors with different resistances.

11. The gear stage display device of claim 2, wherein the first brightness controller is further configured to display a gear stage selected from a plurality of gear stages with the first brightness and the second brightness controller is further configured to display the other non-selected gear stages with the second brightness.

12. The gear stage display device of claim 2, wherein the light-emitting unit includes: a power terminal configured to receive applied power; and a light source configured to generate light based on a current generated by the applied power.

13. The gear stage display device of claim 2, wherein the second brightness controller includes:
a third switching device connected to the light-emitting unit;
a third signal input terminal configured to receive a second brightness control signal and transmit the second brightness control signal to the third switching device;
a fourth switching device connected between the third switching device and the third signal input terminal; and
a fourth signal input terminal configured to receive the gear stage selection signal and transmit the gear stage selection signal to the fourth switching device,
wherein the second brightness controller further includes a second resistor connected between the light-emitting unit and the second switching device.

14. The gear stage display device of claim 13, wherein the second resistor is a variable resistor.

15. The gear stage display device of claim 13, wherein the third signal input terminal and the fourth signal input terminal are connected to the third switching device and the fourth switching device, respectively, via input resistors.

16. The gear stage display device of claim 13, wherein the third switching device is configured to turn off in response to receipt of the second brightness control signal and the gear stage selection signal, and turn on in response to receiving the second brightness control signal.

17. The gear stage display device of claim 2, wherein the brightness control signal includes two pulse width modulation (PWM) signals with different duty ratios input to the first brightness controller and the second brightness controller, respectively.

18. The gear stage display device of claim 2, wherein the brightness control signal includes a PWM signal with a duty ratio input to both the first brightness controller and the second brightness controller, wherein the first brightness controller and the second brightness controller are connected to the light-emitting unit via resistors with different resistances.

* * * * *